United States Patent [19]
Esser

[11] Patent Number: 5,884,946
[45] Date of Patent: Mar. 23, 1999

[54] CONNECTION OF STEEL PIPES FOR CONVEYING SOLID MATERIALS

[75] Inventor: Alexander Esser, Warstein, Germany

[73] Assignee: Esser-Werke GmbH & Co., KG, Warstein, Germany

[21] Appl. No.: 818,512

[22] Filed: Mar. 14, 1997

[30] Foreign Application Priority Data

Mar. 20, 1996 [DE] Germany .................. 196 10 868.3

[51] Int. Cl.$^6$ .................................................. F16L 17/06
[52] U.S. Cl. ......................... 285/368; 285/16; 285/915
[58] Field of Search ........................ 285/16, 15, 363, 285/368, 405, 412, 416, 915

[56] References Cited

U.S. PATENT DOCUMENTS

| | | | |
|---|---|---|---|
| 2,423,213 | 7/1947 | Weber | 285/363 X |
| 2,480,203 | 8/1949 | Steuer | 285/416 X |
| 2,914,350 | 11/1959 | Smith | 285/363 X |
| 4,690,438 | 9/1987 | Kanczarek | 285/363 |
| 5,044,670 | 9/1991 | Esser | 285/16 |
| 5,275,440 | 1/1994 | Esser | 285/416 X |

Primary Examiner—Dave W. Arola
Attorney, Agent, or Firm—Friedrich Kueffner

[57] ABSTRACT

A connection of steel pipes for conveying solid materials, particularly for conveying gravel, includes radially directed coupling flanges which extend circumferentially at the ends of the steel pipes. The coupling flanges have receiving bores for the coupling bolts, wherein the receiving bores extend parallel to the longitudinal axes of the steel pipes and are arranged on a pitch circle. At least one wear ring is inserted between the end faces of the steel pipes which face each other. The wear ring is of a material which has a greater resistance to wear than the material of the steel pipes.

14 Claims, 1 Drawing Sheet

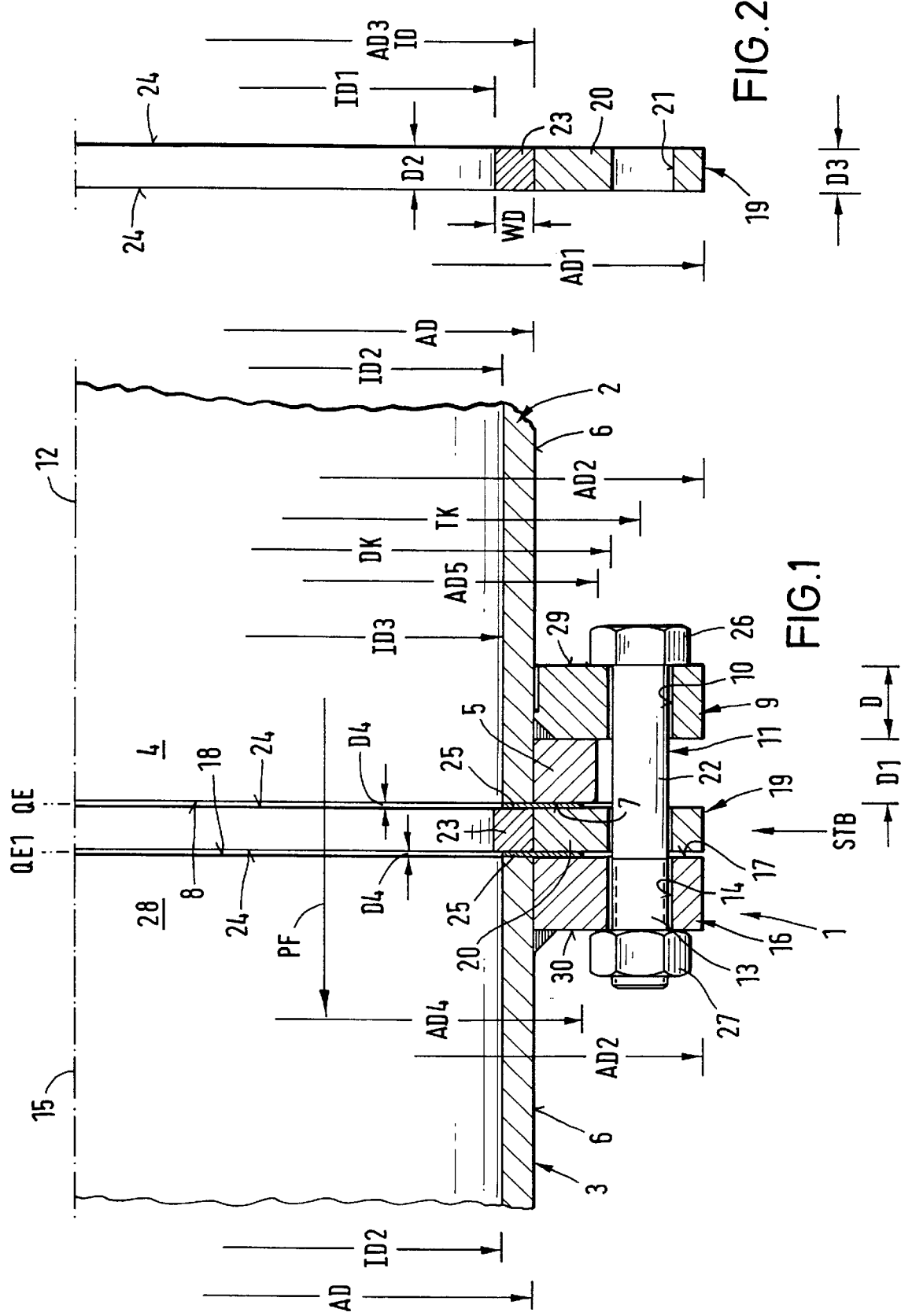

CONNECTION OF STEEL PIPES FOR CONVEYING SOLID MATERIALS

BACKGROUND OF THE INVENTION

1. Field of the Invention

The present invention relates to a connection of steel pipes for conveying solid materials, particularly for conveying gravel.

2. Description of the Related Art

Solid materials, for example, gravel or sand, or also washery refuse and construction materials, are conveyed or transported in strands of pipes which are composed of several steel pipes that are releasably connected to each other. Depending on the type of use, the pipe strands remain placed in one place for a longer period time. However, in other cases, it may be necessary to place the strand at a different location or to extend or shorten the strands within certain time intervals, possibly short intervals.

Because of the high mechanical stresses to which the steel pipes are subjected by the conveyance of solid materials, the pipes are subjected to a high wear essentially over the entire axial length. Consequently, it must be possible to manufacture the steel pipes inexpensively. Moreover, since not all steel pipes which form the strands of pipes wear on the inside thereof as a result of the conveyed solids and since the steel pipes may additionally be subjected to different stresses from the outside, it is also necessary to be able to easily and quickly remove individual steel pipes from an otherwise closed permanent strand of pipes and to be able to insert new steel pipes into the strand without problems.

Consequently, for replacing the pipes and to make it possible to easily place the pipes at a different location, two successive steel pipes in a strand of pipes abut each other in an uncentered manner. Centering means which engage into each other are not provided because this would mean that substantial operations would be required for radially removing a steel pipe from a strand of pipes as well as for inserting a new steel pipe into the strand. This is because several successive steel pipes would have to be separated from each other at the joints and would have to be displaced in axial direction in order to provide sufficient room at the locations of the two joints at the end faces of the steel pipe to be replaced, so that this steel pipe can be removed radially from the strand of pipes and a new steel pipe can be inserted. Subsequently, all axially displaced steel pipes would have to be returned into the original position and would have to be coupled to each other again in a tight manner. In addition, it must be taken into consideration that for each joint it is necessary to remove several coupling bolts which are located on a pitch circle and to return the coupling bolts into the properly oriented positions.

Because two successive steel pipes are joined together uncentered and due to the great tolerances which inevitably occur because of manufacturing reasons of the positions of the receiving bores in the coupling flanges relative to the longitudinal axes of the steel pipes, impact edges may be formed in the interior of the steel pipes in the area of the joint between two steel pipes. Even if the impact edges are small, this has the result that the solid particles being conveyed in the steel pipes are deflected and swirled at the impact edges and hurled against the inner wall surfaces of the steel pipes. This leads to substantial wear phenomena at these locations. These phenomena can be observed especially at the inlet sides of the steel pipes.

In this connection, it must be taken into consideration that the impact area between two steel pipes is not only subjected to wear, but also to a bouncing load resulting from the impinging solid particles.

The steel pipes may be single-layer pipes, or multiple-layer pipes.

SUMMARY OF THE INVENTION

Therefore, it is the object of the present invention to provide a connection of steel pipes for conveying solids, particularly for conveying gravel, which can be manufactured inexpensively and can be assembled and disassembled without difficulty and still ensures a long service life.

In accordance with the present invention, the connection includes radially directed coupling flanges which extend circumferentially at the ends of the steel pipes. The coupling flanges have receiving bores for the coupling bolts, wherein the receiving bores extend parallel to the longitudinal axes of the steel pipes and are arranged on a pitch circle. At least one wear ring is inserted between the end faces of the steel pipes which face each other. The wear ring is of a material which has a greater resistance to wear than the material of the steel pipes.

The present invention provides the advantage that simple and inexpensive pipes without fine tolerances, particularly of a weldable steel, can be used for a strand of pipes for conveying solid materials. No special processing of the ends of the steel pipes is required. It is only necessary to provide the radially extending coupling flanges with the receiving bores for the coupling bolts.

When two steel pipes are joined together, a wear ring is inserted between the end faces of the steel pipes and the location of the wear ring is fixed by means of the coupling bolts. By providing a wear ring of a material which has a greater resistance to wear than the material of the steel pipes, a wear area is produced which substantially reduces the wear occurring especially at the inlet end of a steel pipe. This increases the service life of the individual steel pipes. When wear occurs, it is merely necessary to replace the wear ring. This wear ring is adapted to the joint between the steel pipes in such a way that, after removing at least a portion of the coupling bolts, the wear ring can easily be pulled radially out of the strand of pipes without problems. A new wear ring can also be inserted just as easily and the location of the wear ring can be fixed by means of the coupling bolts. Moreover, the invention provides the particular economical advantage that strands of pipes which are in use can be easily refitted with wear rings and, thus, have a substantially longer service life.

In accordance with a particularly advantageous further development of the invention, the wear ring is composed of an inner layer and an outer layer, wherein the inner layer is of a material which has a greater resistance to wear than the material of the steel pipes, while the outer layer is of a material which has a resistance to wear which is lower than that of the material of the steel pipes. Thus, the outer layer serves to protect the inner layer whose material may be breakable. Moreover, the fact that the wear ring has two layers produces the additional advantage that the wear ring can be repaired. It is only necessary to replace the worn inner layer by a new inner layer.

The outer diameter of the wear ring essentially only has to be so large that the wear ring is held within the cage formed by the coupling bolts. In that case, when the wear ring is to be replaced, it is only necessary to remove about half of the coupling bolts entirely. On the other hand, in accordance with another feature of the invention, the outer layer of the wear ring may be provided with bearings for the coupling bolts. These bearings may be recesses in the edge of the wear ring or the bearings may be throughbores.

In accordance with another feature, the inner layer and the outer layer of the wear ring are glued together. Accordingly, the inner layer remains secured in its position even when it is torn.

Another feature of the invention provides that the inner layer has an inner diameter which is smaller than the inner diameter of the ends of the steel pipes.

In accordance with another feature, the outer diameter of the inner layer of the wear ring corresponds approximately to the outer diameter of the ends of the steel pipes.

The inner layer of the wear ring has a sufficiently long lasting resistance to wear if the axial thickness of the inner layer corresponds approximately to its radial wall thickness. This also reduces the quantity of material which has to be made available for the components having a greater resistance to wear.

In accordance with another feature, the inner layer of the wear ring preferably is of an impact-resistant nickel-containing wear-resistant cast iron, such as Ni-hard. Particularly suitable is Ni-hard IV.

In accordance with another feature, the inner diameter of the outer layer of the wear ring corresponds approximately to the outer diameter of the ends of the steel pipes and the outer diameter of the outer layer of the wear ring corresponds approximately to the outer diameter of the coupling flanges.

This means that the manufacture of the connection is simplified because the outer layer can be manufactured of the same material as the coupling flanges.

In accordance with another feature of the invention, the coupling flanges are connected to the ends of the two steel pipes by welding. The end faces of the coupling flanges which face each other extend in the same transverse planes as the end faces of the two steel pipes. This configuration is of particular advantage if the steel pipes to be connected to each other have a relatively short axial length and a relatively small outer diameter.

In accordance with another embodiment of the invention, the coupling flange at the end of one of the steel pipes is welded to the steel pipe and the end face of the welded coupling flange extends in a transverse plane in which the end face of the corresponding steel pipe also extends. On the other hand, the coupling flange at the other steel pipe is mounted so as to be rotatable about this steel pipe, wherein the coupling flange can be pulled by means of the coupling bolts against a collar welded to the steel pipe, wherein the end face of the collar extends in the transverse plane which also extends through the end face of the steel pipe and wherein the outer diameter of the collar is smaller than the diameter of a circle extending tangentially to the sides of the coupling bolts facing the steel pipe. This embodiment is particularly advantageous in the case of steel pipes which have greater lengths, such as 5 m and more, and greater diameters. This is because, in this case, when two steel pipes are coupled to each other, it is not necessary to ensure that the receiving bores in the coupling flanges of the two steel pipes are in alignment with each other so that the coupling bolts can be easily inserted into the receiving bores. Rather, the receiving bores can be easily placed in alignment with each other by turning the rotatable coupling flange in circumferential direction of the steel pipe until the receiving bores are in alignment with the receiving bores in the other coupling flange which is fixedly welded to the other steel pipe. The outer diameter of the collar welded to the steel pipe is small enough to ensure that the coupling bolts can be easily inserted.

In accordance with another feature, circular ring-shaped sealing disks are inserted between the end faces of the wear ring and at least the end faces of the steel pipes. The sealing disks prevent the solid particles from leaking out at the joints of the steel pipes.

Another feature provides that the inner diameter of the sealing disks is greater than the inner diameter of the inner layer and the outer diameter of the sealing disks is smaller than the diameter of a circle which extends tangentially of the sides of the coupling bolts facing the pipes. As a result of this feature, the sealing disks are practically not subjected to wear from the solids being conveyed at the radially inner circumference and the sealing disks do not extend into the assembly positions of the coupling bolts at the radially outer circumference.

In accordance with another feature of the present invention, sealing rings are provided between the outer layer of the wear ring and the coupling flanges or the collar, wherein the sealing rings are received in the side surfaces of the outer layer. These sealing rings may have a round cross-section or a polygonal cross-section.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a partial vertical sectional view of the joint area between two steel pipes; and FIG. 2 is a partial vertical sectional view of a wear ring for the joint area of FIG. 1.

DESCRIPTION OF THE PREFERRED EMBODIMENTS

FIG. 1 of the drawing shows a connection 1 of two single-layer steel pipes 2, 3 of a weldable material for conveying gravel. The conveying direction is indicated by arrow PF.

A collar 5 is welded to the circumferential surface 6 of the steel pipe 2 at the outlet end 4 of the steel pipe 2. The end face 7 of the collar 5 facing the joint area STB of the steel pipes 2, 3 and the end face of the steel pipe 2 extend in the same transverse plane QE.

A radially directed coupling flange 9 is arranged next to the collar 5 which is fixedly welded to the steel pipe 2. The coupling flange 9 is rotatable in the circumferential direction of the steel pipe 2, as indicated by dash-dot lines provided with arrows. Several receiving bores 10 for threaded bolts 11 are provided staggered in circumferential direction in the coupling flange 9 on a pitch circle TK. The threaded bolts 11 extend with radial play through the receiving bores 10 which extend parallel to the longitudinal axis 12 of the steel pipe 2. The thickness D of the coupling flange 9 corresponds approximately to the thickness D1 of the collar 5.

The threaded ends 13 of the screw bolts 11 also extend with radial play through receiving bores 14 provided in a coupling flange 16 extending radially relative to the longitudinal axis 15 of the steel pipe 3 at the inlet end 28 thereof.

The coupling flange 16 is fixedly welded to the outer surface 6 of the steel pipe 3. The end face 17 of the coupling flange 16 facing the rotatable coupling flange 9 extends in the same transverse plane QE1 in which also the end face 18 of the steel pipe 3 extends.

A two-layer wear ring 19, as shown in FIGS. 1 and 2, is inserted between the end faces 8, 18 of the steel pipes 2 and 3, respectively. The outer layer 20 of the wear ring 19 is of a weldable material. The inner diameter ID of the outer layer 20 corresponds approximately to the outer diameter AD of the steel pipes 2, 3, while the outer diameter AD1 of the outer layer 20 corresponds approximately to the outer diameter AD2 of the coupling flanges 9, 16.

Bearing bores 21 for the screw bolts 11 are provided in the outer layer 20 on the pitch circle TK. The cylindrical shafts 22 of the screw bolts 11 extend in a centering manner through the bearing bores 21.

The inner layer 23 of the wear ring 19 is of an impact-resistant nickel-containing wear-resistant cast iron or Ni-hard. The outer diameter AD3 of the inner layer 23 corresponds approximately to the outer diameter AD of the steel pipes 2, 3, while the inner diameter ID1 is smaller than the inner diameter ID2 of the steel pipes 2, 3. The axial thickness D2 of the inner layer 23 corresponds approximately to the radial wall thickness WD of the inner layer 23 or to the axial thickness D3 of the outer layer 20.

Circular ring-shaped sealing disks 25 are inserted between the end faces 24 of the wear ring 19 and the end faces 8, 18 of the steel pipes 2, 3. The inner diameter ID3 of the sealing disks 25 is greater than the inner diameter ID1 of the inner layer 23. On the other hand, the outer diameter AD4 of the sealing disks 25 is smaller than the diameter DK of a circle extending tangentially of the sides of the shafts 22 of the screw bolts 11 facing the pipes 2, 3.

The axial thickness D4 of the sealing disks 25 is smaller by a multiple than the radial extension thereof between the inner diameter ID3 and the outer diameter AD4.

For connecting the two steel pipes 2, 3, the screw bolts 11 are inserted into the receiving bores 10, 14 and the bearing bores 21, wherein the heads 26 of the screw bolts 11 contact the end face 29 of the rotatable coupling flange 9 facing away from the joint area STB. Nuts 27 are screwed onto the threaded ends 13 of the screw bolts 11, wherein the nuts 27 come into contact with the end face 30 of the coupling flange 16 welded to the steel pipe 3 and facing away from the joint area STB. By tightening the nuts 27, the steel pipes 2, 3 are connected to each other and the wear ring 19 is secured in its position between the steel pipes 2, 3.

Concerning the outer diameter AD5 of the collar 5, it is pointed out that this outer diameter AD5 is smaller than the diameter DK of the circle which extends tangentially of the sides of the shafts 22 of the screw bolts 11 facing the pipes 2, 3.

While specific embodiments of the invention have been shown and described in detail to illustrate the inventive principles, it will be understood that the invention may be embodied otherwise without departing from such principles.

I claim:

1. A connection of steel pipes for conveying solid materials, particluarly for conveying gravel, wherein each steel pipe has a longitudinal axis and ends with end faces, the connection comprising radially directed coupling flanges mounted circumferentially at the ends of each steel pipe, each coupling flange having a plurality of receiving bores arranged on a circle and extending parallel to the longitudinal axes of the steel pipes, and coupling bolts inserted in the receiving bores, further comprising at least one wear ring placed between the end faces of the steel pipes which face each other, wherein the at least one wear ring is comprised of an inner layer and an outer layer surrounding the inner layer, wherein the inner layer is of a material which has a greater resistance to wear than the material of the steel pipes, wherein the outer layer is of a material which has less resistance to wear than the material of the steel pipes, and wherein the outer layer comprises bearing bores located in alignment with the receiving bores of the coupling flanges.

2. The connection according to claim 1, wherein the inner layer is glued to the outer layer.

3. The connection according to claim 1, wherein the ends of the steel pipes have an inner diameter, and wherein the inner layer has an inner diameter which is smaller than the inner diameter of the ends of the steel pipes.

4. The connection according to claim 1, wherein the ends of the steel pipes have an outer diameter, and wherein the inner layer has an outer diameter corresponding essentially to the outer diameter of the ends of the steel pipes.

5. The connection according to claim 1, wherein the inner layer has an axial thickness and a radial wall thickness, and wherein the axial thickness corresponds essentially to the radial wall thickness.

6. The connection according to claim 1, wherein the inner layer is of an impact-resistant Ni-hard.

7. The connection according to claim 6, wherein the inner layer is of Ni-hard IV.

8. The connection according to claim 1, wherein the ends of the steel pipes have an outer diameter and the coupling flanges have an outer diameter, and wherein the outer layer has an inner diameter corresponding essentially to the outer diameter of the ends of the steel pipes, and wherein the outer layer has an outer diameter corresponding essentially to the outer diameter of the coupling flanges.

9. The connection according to claim 1, wherein the coupling flanges are welded to the ends of the steel pipes, wherein the coupling flanges have end faces facing each other, and wherein the end faces of the steel pipes extend in transverse planes, and wherein the end faces of the coupling flanges extend in the transverse planes of the end faces of the steel pipes.

10. The connection according to claim 1, wherein the coupling flange of a first of the steel pipes is welded to the end of the first steel pipe, wherein the coupling flange has an end face, and wherein the end face of the coupling flange and the end face of the first steel pipe extend in a common transverse plane, the coupling flange of a second of the steel pipes being mounted on the second steel pipe so as to be rotatable, further comprising a collar welded to the second steel pipe, such that the coupling bolts are capable of pulling the rotatable coupling flange against the collar, wherein the collar has an end face, wherein the end face of the collar and the end face of the second steel pipe extend in a common transverse plane, and wherein the collar has an outer diameter which is smaller than a diameter of a circle extending tangentially of sides of the coupling bolts facing the second steel pipe.

11. The connection according to claim 1, comprising circular ring-shaped sealing disks placed between end faces of the wear ring and at least the end faces of the steel pipes.

12. The connection according to claim 11, wherein the sealing disk has an inner diameter which is greater than an inner diameter of the inner layer and the sealing disk has an outer diameter which is smaller than a diameter of a circle extending tangentially of sides of the coupling bolts facing the steel pipes.

13. The connection according to claim 1, comprising sealing rings placed between the outer layer and the coupling flanges, wherein the sealing rings are received in side surfaces of the outer layer.

14. The connection according to claim 1, comprising sealing rings placed between the outer layer and the collar, wherein the sealing rings are received in side surfaces of the outer layer.

* * * * *